US008812597B2

(12) United States Patent
Le Bodic et al.

(10) Patent No.: US 8,812,597 B2
(45) Date of Patent: Aug. 19, 2014

(54) METHOD AND SYSTEM FOR INSTANT MESSAGING TRAFFIC ROUTING

(75) Inventors: Gwenael Le Bodic, Montreal (CA); Alain Caron, Montreal (CA); Jean Regnier, Laval (CA); Manuel Laflamme, Brossard (CA)

(73) Assignee: Synchronica plc, Kent (GB)

( * ) Notice: Subject to any disclaimer, the term of this patent is extended or adjusted under 35 U.S.C. 154(b) by 1317 days.

(21) Appl. No.: 12/033,489

(22) Filed: Feb. 19, 2008

(65) Prior Publication Data

US 2008/0201441 A1    Aug. 21, 2008

Related U.S. Application Data

(60) Provisional application No. 60/890,854, filed on Feb. 21, 2007.

(51) Int. Cl.
*G06F 15/16* (2006.01)
*H04L 12/58* (2006.01)

(52) U.S. Cl.
CPC ........... *H04L 12/581* (2013.01); *H04L 12/5895* (2013.01); *H04L 12/58* (2013.01); *H04L 51/04* (2013.01)
USPC .......................................................... 709/206

(58) Field of Classification Search
CPC . H04L 51/04–51/046; H04L 12/581–12/5835; H04L 12/589–12/62
USPC .......................................................... 709/206
See application file for complete search history.

(56) References Cited

U.S. PATENT DOCUMENTS

| 6,564,261 B1 | 5/2003 | Gudjonsson et al. |
| 7,010,303 B2 | 3/2006 | Lewis et al. |
| 7,761,321 B2 * | 7/2010 | Kannan et al. ............... 705/7.13 |

(Continued)

FOREIGN PATENT DOCUMENTS

WO    2004/059417 A2    7/2004

OTHER PUBLICATIONS

"Webster's New World Computer Dictionary". Definition of "instant messaging (IM)". Wiley Publishing, 2003. <http://www.credoreference.com/entry/webstercom/instant_messaging_im>.*

(Continued)

*Primary Examiner* — Ashok Patel
*Assistant Examiner* — Kevin Bechtel
(74) *Attorney, Agent, or Firm* — Soquel Group LLC

(57) ABSTRACT

There is described an interconnect hub for routing an Instant Message (IM) or related communication between a sending IM device in a first IM community and a recipient IM device in one of a plurality of potential second IM communities. The interconnect hub comprises a router for determining the destination of IM communications and routing the IM communications to the intended recipient, a search function for finding the service provider providing IM services to the user identifier, and a cache comprising a plurality of records associating user identifiers with corresponding service providers (mobile or Internet). When the IM communication is received by the interconnect hub, the router examines the recipient user identifier, accesses the cache keying on the recipient user identifier, retrieves the service provider associated with the recipient user identifier, and forwards the IM communication to the associated service provider for delivery to the intended recipient. If there is no record in the cache for the user identifier, the searcher initiates a search to identify the service provider and to update the cache if the service provider is found.

24 Claims, 4 Drawing Sheets

(56) References Cited

U.S. PATENT DOCUMENTS

| | | | |
|---|---|---|---|
| 2004/0064512 A1* | 4/2004 | Arora et al. | 709/206 |
| 2004/0096048 A1* | 5/2004 | Sacra | 379/221.13 |
| 2004/0244102 A1* | 12/2004 | Benzon et al. | 4/420 |
| 2005/0027688 A1* | 2/2005 | Brady et al. | 707/3 |
| 2005/0198164 A1* | 9/2005 | Moore et al. | 709/206 |
| 2006/0034267 A1* | 2/2006 | Torrey et al. | 370/360 |
| 2007/0155361 A1* | 7/2007 | Maes | 455/403 |
| 2007/0180123 A1 | 8/2007 | Bennett | |

OTHER PUBLICATIONS

"About.com: Web Browsers—Meebo". <http://browsers.about.com/od/48/gr/meebofirefox.htm>. Internet Archive. Web-page documented: Aug. 16, 2007. <http://web.archive.org/web/20070816054609/http://browsers.about.com/od/48/gr/meebo-firefox.htm>.*

ETSI TS 100 927 V7.7.0 (Jun. 2002), ETSI technical specifications, pp. 8-9 and pp. 11-12. Also referred to as 3GPP TS 03.03 V7.7.0 (Release 1998) www.3pgg.org.

* cited by examiner

METHOD AND SYSTEM FOR INSTANT MESSAGING TRAFFIC ROUTING

RELATED APPLICATION

This application claims the benefit of U.S. Provisional Patent Application 60/890,854 filed Feb. 21, 2007, which is incorporated herein by reference.

FIELD OF THE INVENTION

The present invention relates to a method and system for Instant Message (IM) traffic routing. In particular, the present invention is related to a method and system for identifying mobile service providers serving mobile IM users and Internet providers serving Internet IM users.

BACKGROUND OF THE INVENTION

In the wireless world, a subscriber to a mobile service is typically identified through the number allocated to its mobile station Mobile Directory Number (MDN), an example of which is the Mobile Station Integrated Services Digital Network (MSISDN) number used within Global System for Mobile Communications (GSM). Each MDN is typically assigned to a unique mobile service provider. In most countries, different mobile service providers are provided with distinct, non-overlapping ranges of MDNs, and changing one's service provider thus requires changing one's MDN. The introduction of Mobile Number Portability (MNP) solves this problem by enabling users to keep their MDN while changing service providers. From a consumer perspective, MNP removes a barrier to change. Indeed, the transition between mobile service providers is easier for users who can now change service providers without dealing with issues that were typically associated with such a transition, for instance expenses related to modifying materials of business (invoices, business cards, etc.). MNP also allows consumers to pursue better service or rates with a new service provider and has the effect of allowing service providers to compete fairly, thus making the market more competitive by alleviating vendor lock-in. However, one drawback of MNP is the need to identify the service provider(s) currently serving the MDN for a call or message to find its way to the intended recipient.

Other issues arise with the proliferation of Instant Messaging (IM) services, which solve the growing desire to communicate faster by allowing for near-real time text-based communication. In IM, users exchange messages through an IM service, to which they are continually connected. "Presence management", i.e. knowing the availability of a user on one's list of contacts for receiving messages along with what system the user resides on, forms an important part of the IM system. Over the past few years, availability of IM has spread from initially only dial-up Internet users to include users of mobile devices, such as cellular phones and Personal Digital Assistants (PDAs). As mobile service providers are now launching their own mobile IM services, there is an increasing need for these different IM services to work cooperatively in order to ensure successful operation of the overall IM system. Indeed, although mobile IM users are often not aware of the mobile service providers serving other IM users on their list of contacts, they should be able to exchange IM messages with these contacts, regardless of whether they are served by different service providers. Another concern arises from the fact that users of mobile IM services may choose to be identified in a given IM community through an Internet address, which is typically different from their MDN. Indeed, mobile IM users may want to protect the privacy of their MDN or prefer to use a friendlier address than their MDN for the purpose of sending IM messages. As a result, a mobile IM user adding another user as a contact does so using the contact's MDN, as he/she is typically unaware of the corresponding Internet address. In order to route subsequent IM messages to this newly added contact, the mobile user's IM service will therefore need to retrieve the contact's Internet address by querying a remote system using the MDN as an input key. Although this transaction has been standardized by the Open Mobile Alliance (OMA) and by the GSM Association (GSMA), the issue of identifying the remote entity to query still remains to be solved.

Further issues arise when the scope of IM services is expanded to enable users of Internet IM services to interconnect with users of mobile IM services. In this case, users of Internet IM services are allowed to add as contacts and exchange messages with users of mobile IM services, and vice-versa. However, Internet IM Service Providers (IISPs) do not have access to the infrastructures of mobile service providers such as MNP. As a result, when an Internet IM user wants to interact with a mobile IM user, it becomes difficult for the IISP, which serves the Internet IM user, to identify the mobile service provider that should be queried to retrieve the Internet address corresponding to the MDN of the newly added contact (mobile IM user). In addition, some IISPs allow Internet addresses that cannot be mapped to a unique IISP, making the identification task even more complex as users are no longer uniquely identified through their Internet address. Indeed, with the event of Passport Technology, a user belonging to two distinct Internet IM communities can be identified in these two Internet IM communities using the same Internet address. A user of a mobile IM service wanting to exchange messages with a user of an Internet IM service typically does so by adding the Internet address of this new contact in his/her contact list. As a given Internet address can be valid for more than one Internet IM service, as well as point to entirely different users in different Internet IM services, the mobile service provider will therefore have difficulty determining, based solely on the contact's Internet address, which Internet IM service to contact to direct IM messages. Routing traffic between IM systems can thus prove cumbersome, unless there is provided a detailed mapping, which associates each user's Internet address or MDN to the corresponding IM service.

As known in the art, some solutions have been envisaged for mapping MDNs to their serving mobile service providers. One prior art method involves the Signaling System No. 7 (SS7) network, which interconnects the mobile service providers' infrastructures. The SS7 network includes repositories called Home Location Registers (HLRs), which can be queried to identify the service provider serving a specific MDN. Indeed, a HLR is a database that contains mobile subscriber information for a wireless service provider's entire subscriber base. Such information includes the unique International Mobile Subscriber Identity (IMSI), service subscription information, and location information to enable the routing of mobile-terminated calls. For example, when a user dials a mobile subscriber's MDN, the HLR is queried based on the MDN to obtain the requisite routing information. When the HLR receives the routing request, it maps the MDN to the IMSI, from which the mobile service provider serving the MDN can be found and the call routed. However, using the SS7 network is expensive and increases the traffic load carried by the network, thus requiring the purchase of additional equipment. Moreover, the SS7 network is not accessible outside of the community of telecommunications service providers and entities such as IISPs therefore have no access to it.

Another prior art solution involves the MNP database (MNP-DB), which is a central repository that contains a mapping between MDNs and the serving service providers for users that have a new address, i.e. have been "ported out". The MNP-DB is queried for this information to enable a call made to a ported number to be routed to the appropriate mobile network. MNP-DBs are typically managed in a centralized or distributed manner. In the centralized model, a single reference database containing data for all mobile numbers is used. The database is generally managed by a consortium of network service providers, comprising only mobile network service providers or all network service providers involved in routing calls to mobile subscribers. However, one drawback with this method is that mobile service providers need to provide the company operating the MNP-DB with MNP information in order to proceed with manual replacement of outdated records and this management of the database is complex. In the distributed model, multiple databases contain subsets of the total data, for instance each separate database may comprise the numbers assigned to a specific mobile network service provider. Since the full set of information about all mobile numbers is only available from these separated databases when taken as a whole, access to information may prove difficult in this model. Indeed, it becomes complex to identify which database should be queried to get information on a specific mobile number. Also, the distributed model requires connections to all the databases in order to access records.

What is needed therefore is an easier and more efficient way of identifying the mobile service provider or Internet IM Service Provider serving a given user identifier in order to properly route IM traffic in the event of MNP and/or Passport Technology.

The present description refers to a number of documents, the content of which is herein incorporated by reference in their entirety.

SUMMARY OF THE INVENTION

More specifically, in accordance with the present invention and in order to address the above and other drawbacks, there is provided an interconnect hub for routing an Instant Message (IM) and/or related communications such as presence updates (hereinafter referred to collectively as instant message (IM) communications) between a sending IM device in a first IM community (mobile or Internet) and a recipient IM device in one of a plurality of potential second IM communities. The interconnect hub comprises a router for determining the destination of IM communications and routing the IM communications to the intended recipient, a search function for finding the service provider providing IM services to the user identifier, and a cache comprising a plurality of records associating user identifiers with corresponding service providers (mobile or Internet). When the IM communication is received by the interconnect hub, the router examines the recipient user identifier, accesses the cache keying on the recipient user identifier, retrieves the service provider associated with the recipient user identifier, and forwards the IM communication to the associated service provider for delivery to the intended recipient. If there is no record in the cache for the user identifier, the searcher initiates a search to identify the service provider and to update the cache if the service provider is found.

Other features of the present invention will become more apparent upon reading of the following non-restrictive description of specific embodiments thereof, given by way of example only with reference to the accompanying drawings.

DESCRIPTION OF ILLUSTRATIVE EMBODIMENT

The present invention is illustrated in further details by the following non-limiting examples.

Figure 1:
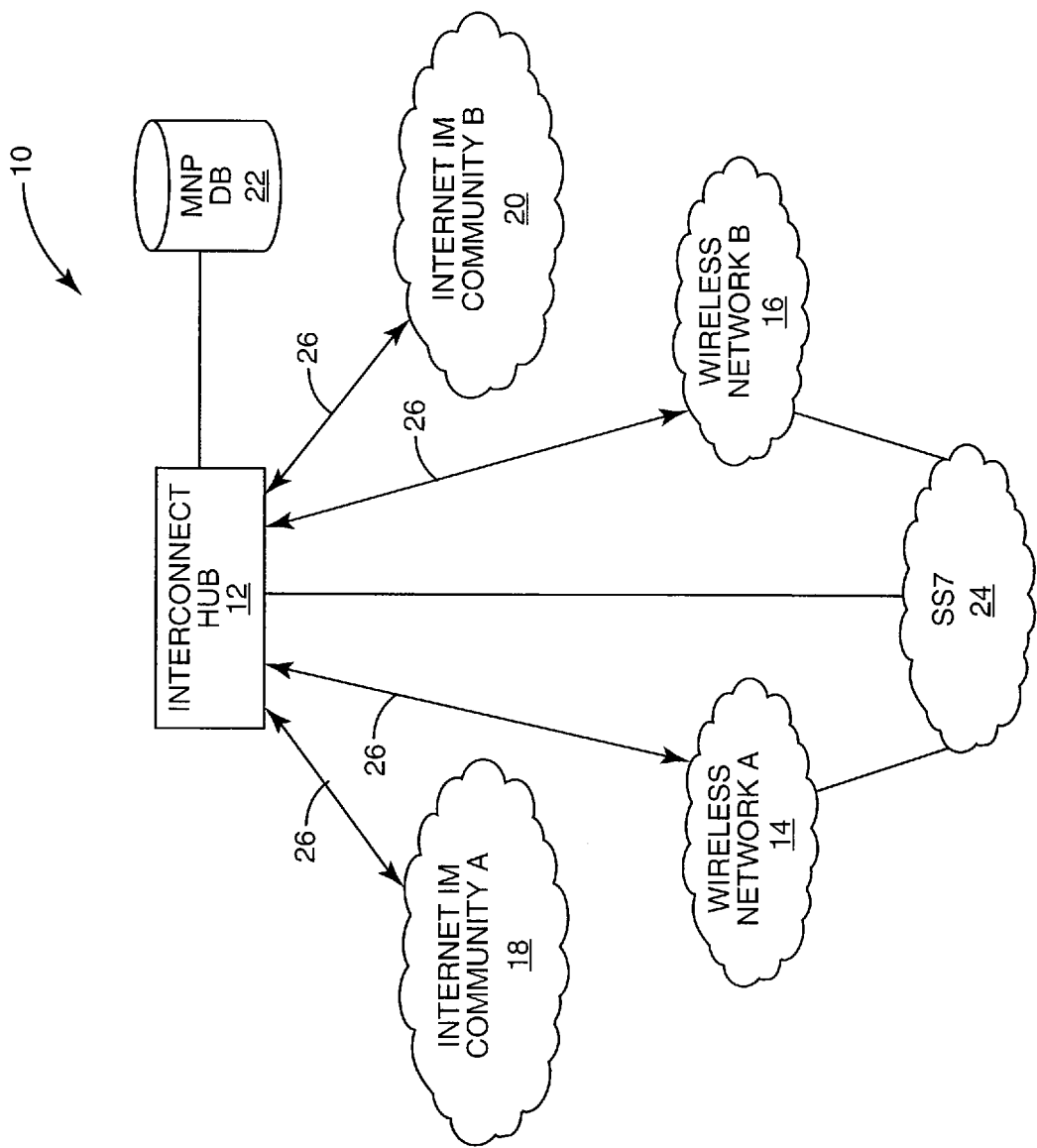
FIG. 1 is a schematic diagram of a system for routing traffic between instant messaging communities in accordance with an illustrative embodiment of the present invention.

Referring to FIG. 1, and in accordance with an illustrative embodiment of the present invention, a system and method for routing traffic between IM communities (mobile and Internet) within a telecommunications network will now be described. At the centre of the system, generally referred to using the reference numeral 10, is an interconnect hub 12, which bridges a set of wireless (or mobile) networks 14 and 16 as well as Internet IM communities 18 and 20. The interconnect hub 12 is also linked to a mobile number portability (MNP) database 22, typically via a broadband connection or the like. Each wireless network 14 and 16 is also illustratively connected to a Signaling System No. 7 (SS7) telecommunications network 24 and so is the interconnect hub 12 for the purpose of sending identification queries, as will be described in more detail herein below. For sake of simplicity and illustration, only two wireless networks and two Internet IM communities are shown in FIG. 1, although it should be understood that in a given implementation the interconnect hub 12 typically would bridge a plurality of wireless networks and Internet IM communities.

The wireless networks as in 14 or 16 are illustratively domains served by a telecommunications operating company, a mobile service provider, which provides mobile telephony services to subscribers. T-Mobile™, Cingular™ and Verizon Wireless™ are examples of such mobile service providers operating in the United States. Similarly, within each Internet IM community 18 or 20, Internet IM Service Providers (IISPs), which operate for example an Internet portal, provide a range of products and services to subscribers, including, but not limited to, IM and presence services. MSN and Yahoo!™ provide well known illustrative examples of such IISPs.

Within an IM system (mobile or Internet), IM messages and related traffic are routed by an IM server, which performs IM services and stores a database of user identifiers (aliases of registered users) as well as their state (i.e. whether a user is available to receive an IM message or not). If the receiver is available for chatting, i.e. authorized other users to subscribe to and see his/her presence, a session is established over an Internet connection that enables sender and receiver to exchange IM messages through the hub 12. The chat session is ended when the conversation is completed and one or the other user closes the session.

Figure 2:
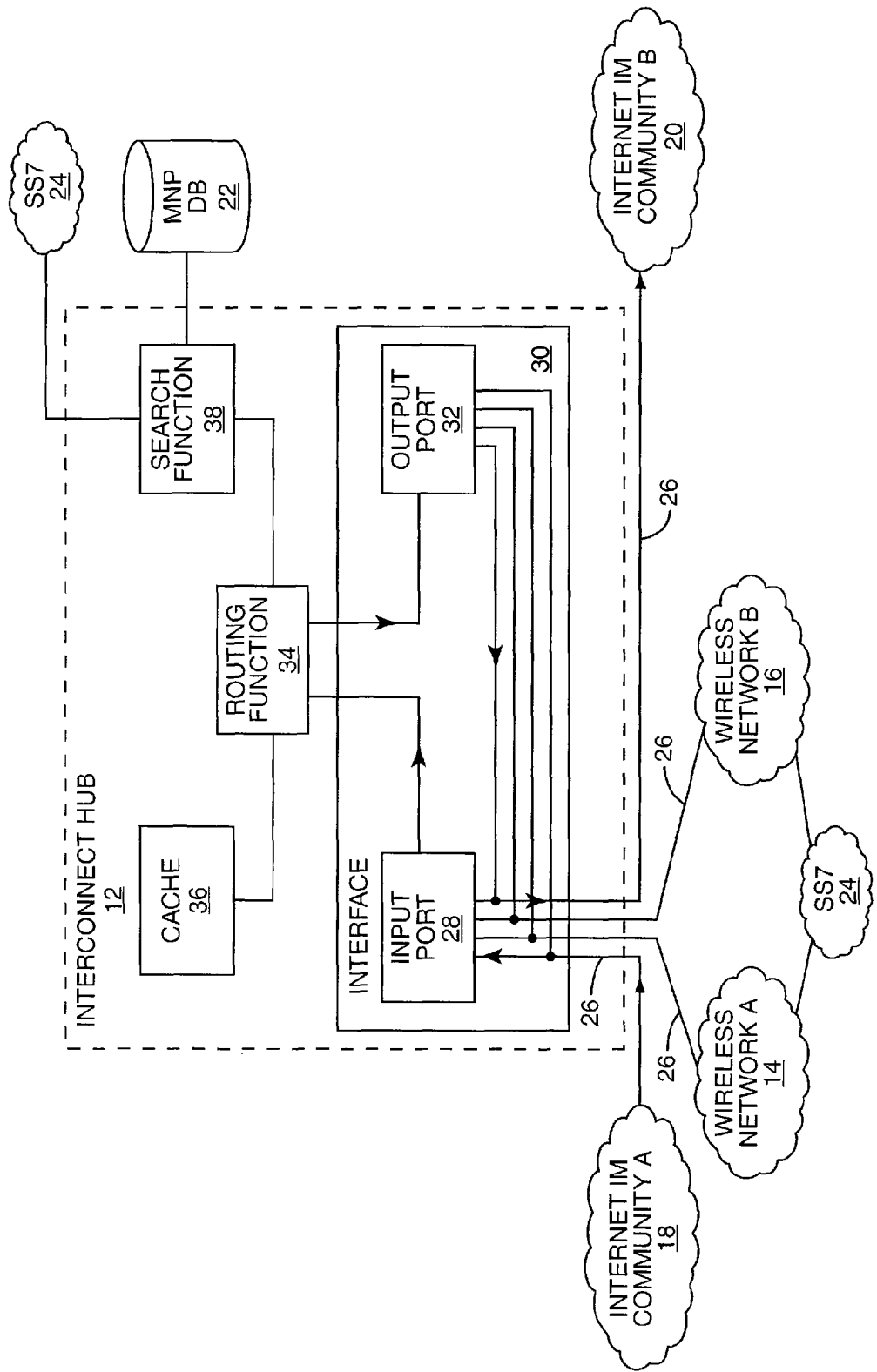
FIG. 2 is a schematic diagram of the interconnect hub and its components in accordance with an illustrative embodiment of the present invention.

Referring now to FIG. 2, the interconnect hub 12 is connected to various wireless networks as in 14 and 16 and Internet IM communities as in 18 and 20 through server-toserver protocols using connections such as Hypertext Transfer Protocol over Secure Socket Layer (HTTPS) or long-lived Transmission Control Protocol (TCP) connections. While HTTPS is a method of establishing a secure Hypertext Transfer Protocol (HTTP) connection, TCP is the transport protocol used in the protocol suite in widespread usage with the Internet, namely the Transmission Control Protocol/Internet Protocol (TCPIIP). These server-to-server protocols support various transactions such as for subscribing to presence, propagating chat messages, as well as querying as will be described herein below.

Still referring to FIG. 2, the hub 12 typically receives a request to route an IM message or related communication to a user identifier (MDN or Internet userID) via the communication channels 26 supported by the server-to-server protocols. The requests are received at the hub's input port 28, which is part of the interface 30, and exit at the output port 32 for delivery to the intended recipient. Typically, such a request includes at least the recipient of the IM message in question and the IM message. To identify the destination of the IM message or related communication, the interconnect hub 12 sends the request to its routing function 34, which will determine where the IM message should be directed to. Upon reception of the IM request, the routing function 34 typically already knows the mobile service provider or IISP serving the recipient (MDN or Internet userID) as a result of prior identification processes triggered by the input of a new contact into the sender's contact list.

Indeed, in order to exchange IM messages with a recipient IM user for the first time, the sender typically first adds the recipient as a new contact into his/her contact list. This is done by entering either the recipient's MDN or the Internet userID, if known. Typically, a mobile or Internet IM user wanting to communicate with a mobile IM user has no knowledge of the Internet userID and will thus input the contact's MDN into the contact list. To ensure proper treatment of any subsequent IM traffic to the recipient, the IM service, which serves the sender, generates a transaction defined by the GSMA, hereinafter "VerifyID transaction", using the known MDN as an input key to query the hub 12 and retrieve the contact's Internet userID and serving mobile service provider. As described further herein below, the hub 12 will then use the long-lived cache 36 and/or the search function 38 to identify the mobile service provider serving the given MDN along with the corresponding Internet userID (of the type MDN@serviceprovider.name or username@serviceprovider.name for instance). If the MDN is new to the hub 12, the cache 36 will be updated from the search results. The hub 12 then returns the identified Internet userID and service provider to the IM service of the user who originally added the contact. In subsequent transactions, such as routing IM messages to this contact, the IM service will use the Internet userID as opposed to the MDN, thereby bypassing the need for the hub 12 to retrieve the Internet userID from the MDN once again.

When a mobile IM user adds a new contact by inputting the Internet userID, the user's mobile IM service illustratively generates a VerifyID transaction to the hub 12 for the given Internet userID. The purpose of this process is to identify the domain and thus the mobile service provider or IISP, which serves the contact's Internet userID. This VerifyID transaction also solves issues related to routing IM traffic to Internet userIDs valid in more than one Internet IM service. Upon reception of the VerifyID transaction, the hub 12 parses the Internet userID to identify the mobile service provider or IISP, which serves the user. For example, for the Internet userID jean@aol.com, the hub 12 will identify aol.com as the domain of the newly added contact and AOL™ as the IISP serving it.

If the identified domain does not support the VerifyID transaction, the hub 12 associates it as the one serving the Internet userID and returns the Internet userID to the mobile IM service as being the result of the VerifyID transaction. Validation is only obtained after the user adds the new contact using the returned Internet userID as an input, thus triggering a request to obtain the contact's presence information. This request is communicated by the mobile IM service to the hub 12, which relays it to the Internet IM service (IISP) serving the Internet userID. If this Internet IM service recognizes the Internet userID, it may respond positively to the request, thus confirming that the hub 12 correctly associated the Internet userID with the domain. Even if the contact denies authorization to his/her presence, the confirmation still arises as the domain's reply, for instance "user offline", implies that the Internet userID belongs to the domain although he/she may have refused authorization to his/her presence. Otherwise, if the Internet IM service's reply, for example "user unknown", indicates that the hub 12 incorrectly associated the Internet userID with the domain, the hub 12 initiates a VerifyID transaction with all other domains susceptible of hosting the Internet userID. Alternatively, the hub 12 may directly request the contact's presence information to all domains that potentially serve the Internet userID. Based on the responses from the various domains, resulting actions will be similar to the ones described herein below when the domain initially identified by the hub 12 supports the VerifyID transaction but responds negatively to the validation query.

If the domain identified by the hub 12 supports the VerifyID transaction, the hub 12 queries it to validate whether the Internet userID exists. If it receives a positive response from the domain, it is associated with the Internet userID by the hub 12. Otherwise, the hub 12 queries all other domains that can potentially host the Internet userID. If none of these domains respond positively, the transaction fails and the hub 12 provides the appropriate error code, for example "user unknown". If one of the domains responds positively, the hub 12 associates the Internet userID with this domain. If more than one domain respond positively, the hub 12 either fails the transaction or returns the list of the positively replying domains to the user's mobile IM service, which in turn requests the user to select the appropriate domain. In either case, the sender's mobile IM service will eventually be able to identify which domain and thus which IISP is associated with the given Internet userID.

For Internet userIDs whose serving IISP is not easily identifiable from the domain, the routing function 34 may illustratively look in the long-lived cache 36 for the association between Internet userID and IISP. This is the case for example for the Internet userID jean@hotmail.com whose domain is hotmail.com but whose IISP is MSN™, Hotmail™ being invalid as an IISP. If the association is not already stored in the cache 36, the interconnect hub 12 needs to call on the search function 38 to implement one of the search algorithms discussed in more detail herein below in order to find the IISP servicing the user identifier and route any subsequent IM messages properly.

Still referring to FIG. 2, the long-lived cache 36, which is linked to the interconnect hub's routing function 34, retains a listing of user identifiers (MDN, Internet userID), mobile service providers and IISPs present in the network. Up to three basic fields are stored per record: an MDN field, an Internet userID field, and a service provider field. While the service provider field is mandatory, at least one of the MDN and Internet userID fields must be defined and storing both in the cache 36 is optional. The main purpose for the cache as in 36 is to provide a mapping between the fields of each record, i.e. associate each user identifier to its serving mobile service provider or IISP(s). This association can be obtained through identification (or search) queries implemented by the search function 38 of the interconnect hub 12 through various search algorithms, as will be described herein below. Search queries are sent to each community (mobile IM or Internet IM community) and the responses are returned through the communication channels 26 supported by the hub's interconnect server-to-server protocols (not shown).

Still referring to FIG. 2, whenever a mobile service provider or an IISP receives a search query, it replies positively if it does indeed serve the given user identifier or negatively (e.g. "user unknown") otherwise. As a result, depending on the query results, which are sent back to the hub's routing function 34, the latter either identifies that no reachable mobile service provider or IISP serves the user identifier, one mobile service provider or IISP serves the user identifier; or multiple mobile service providers or IISPs serve the user identifier. Each record within the cache 36 is then updated accordingly by storing the information (e.g. serving mobile service provider or IISP ID) in the appropriate fields.

An association between the user identifier and its corresponding serving mobile service provider(s) or IISP(s) is therefore available in the long-live cache 36 for use by the interconnect hub 12. If an MDN is provided as part of the search query, the corresponding Internet userID can optionally be stored in the cache 36 for optimization purposes. In addition, if the Internet userID field is assigned a value in the cache 36, the corresponding serving mobile service provider or IISP can be determined from the domain name in this Internet userID, as mentioned previously, and this information does not need to be physically stored in the cache 36. For example, for the Internet userID jean@aol.com, the domain name is aol.com, thus inferring that it is served by the AOL™ IISP, information which does not necessarily need to be stored in the cache 36. For each record, since one field can sometimes be inferred from the other, it may be sufficient to assign a value to at least one of the MDN or Internet userID fields, making them optional.

Figure 3:
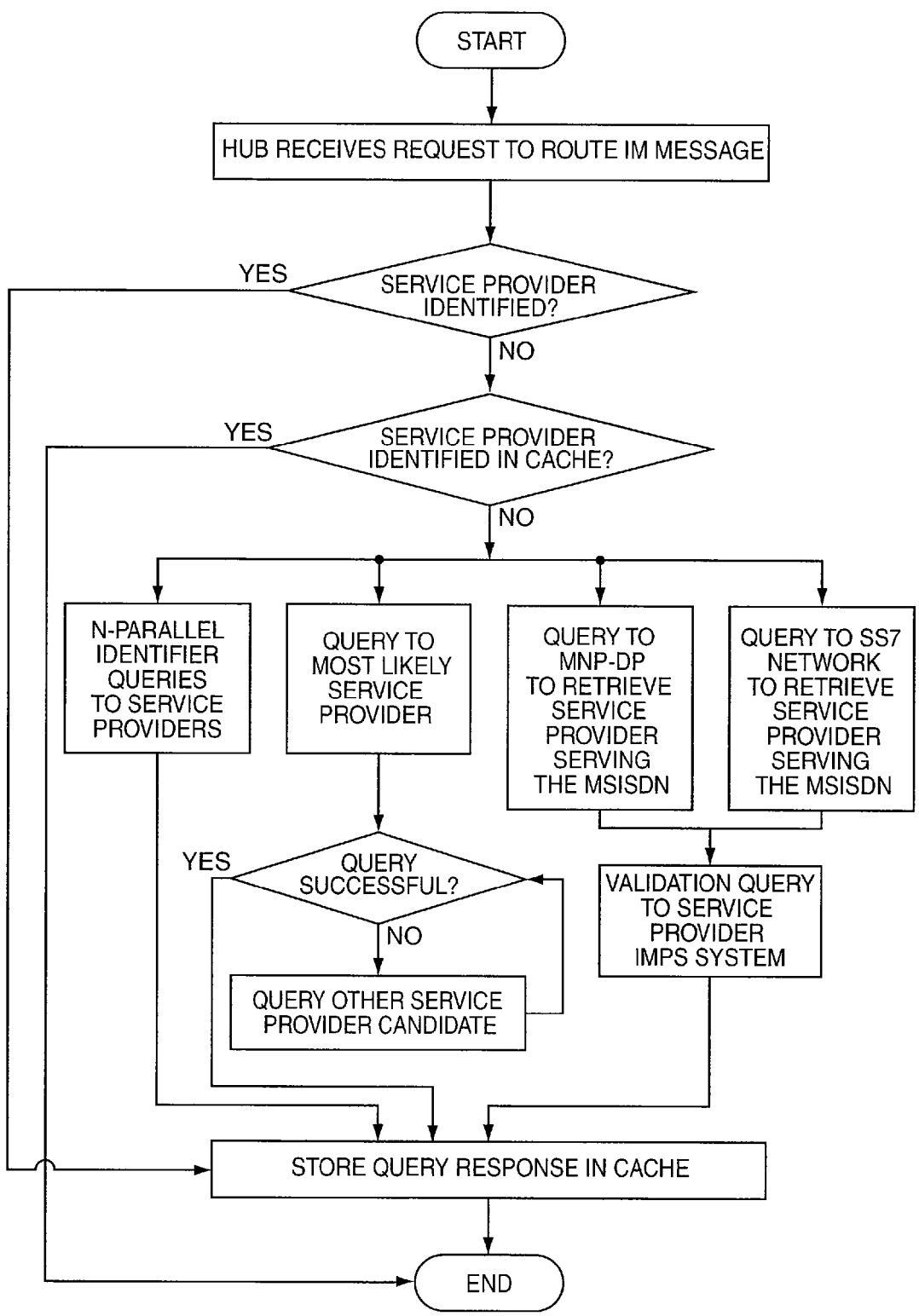
FIG. 3 is a flow chart summarizing the steps implemented during a search query procedure in accordance with an illustrative embodiment of the present invention.

Referring now to FIG. 3 in addition to FIG. 2, different search algorithms can be implemented by the interconnect hub's search function 38 to identify the destination of IM traffic or related communications. As mentioned herein above, the routing function 34 of the interconnect hub 12 calls on the search function 38 whenever the IM message's destination is unknown. Typically, search procedures are only carried out once when the association between user identifier (MDN or Internet userID) and corresponding mobile service provider or IISP(s) is not stored in the hub's local cache 36. They need not be invoked again once the information is stored, unless a subsequent routing request using the cached address results in an error, thus invalidating the cache record. As a result, this method reduces the number of queries required.

The search function 38 can implement "one shot-N parallel queries", where N parallel identifier queries are sent through the communication channels 26 to mobile service providers or IISPs that are candidates for serving the given MDN or Internet userID (not shown). The basis for candidate selection will be explained herein below. When a mobile service provider or IISP receives a query regarding a specific user identifier, a database (e.g. HLR in the case of a mobile service provider) check is run within its own domain to see whether it serves the user identifier and if so, a positive response is sent to the search function 38. The search function 38 will thus receive N positive or negative responses from all N mobile service providers or IISPs queried, on the basis of which the serving mobile service provider(s) or IISP(s) can be eventually identified.

Another type of search algorithm, the "likely query first" can be implemented in two stages. In a first stage, a query is submitted to the mobile service provider or IISP most likely to be serving the given user identifier. In this case, the candidate is typically the original owner of the MDN range or the domain name owner. If the query response is positive, i.e. the queried candidate is indeed the user identifier's serving mobile service provider or IISP, the procedure ends and the cache 36 is updated accordingly. However, if the first stage of the procedure is unsuccessful, i.e. the mobile service provider or IISP to which the first query was submitted sends a negative response (e.g. "user unknown") to the interconnect hub 12, then other candidates for supporting the user identifier are further queried until a match is made.

"MNP query followed by a query to the identified service provider" is another algorithm, which initially submits a query to an MNP database 22 to identify the mobile service provider currently serving the MDN. The MNP database 22, as will be described in further detail herein below, identifies the serving mobile service provider for a given MDN. Once the mobile service provider has been fetched from this database, the interconnect hub 12 submits a validation query to the mobile IM service associated with the identified mobile service provider. This validation step aims at ensuring that the given MDN corresponds to a valid IM user account for the mobile service provider's IM service.

An additional search algorithm that can be implemented is the "SS7 query followed by a query to the identified service provider", which is similar to the previous search procedure, except that requests are initially made to the SS7 network 24 instead of the MNP database 22. The context in which the present invention is deployed along with its technological capabilities will determine the appropriate search algorithm to be applied. For instance, for a deployed context in which MNP is supported and an MNP database is provided, the most effective method will be the MNP query algorithm described earlier. However, in a context where MNP is supported but no MNP database is provided, the "likely query first" algorithm is more suitable.

Figure 4:
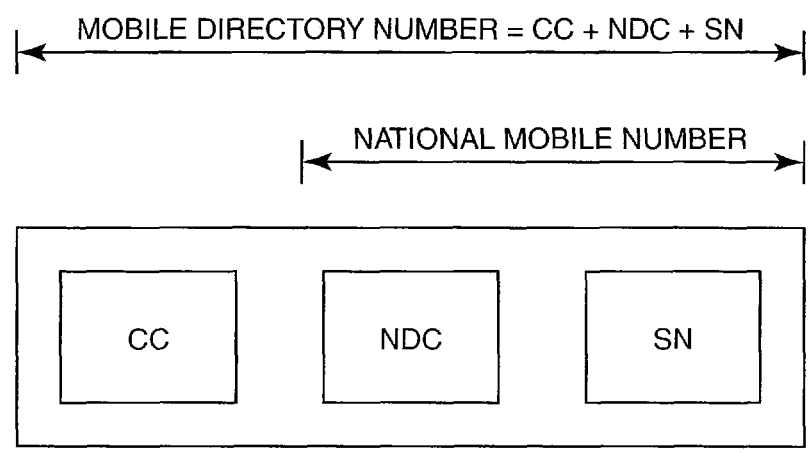
FIG. 4 is a representation of the MDN structure.

For each search algorithm, the queried candidates can be chosen based on the user identifier type, MDN or Internet userID. According to ITU recommendations, the MDN is composed of a country code (CC), followed by a national destination code (NDC) and a subscriber number (SN), as illustrated in FIG. 4. If the user identifier is an MDN, the service provider candidates are then identified through the country code i.e. the first few digits in the MDN number and will be all mobile service providers serving subscribers in the country matching the country code. For example, the country code for the MDN 49 171 118 94 97 is 49, which is the country code for Germany. As a result, the mobile service provider candidates for serving this German MDN are all German service providers (e.g. E-plus, T-Mobile DE and Vodafone DE) and simultaneous ("one shot-N parallel queries" algorithm) or subsequent queries ("likely query first" algorithm) will be sent to these mobile service providers to identify the one serving the given MDN. In the case of MNP or SS7 type queries, the mobile service provider candidate will be the one responding positively to the initial MNP or SS7 query. Further, if the user identifier is an Internet userID of the type username@domain.name, the mobile service provider or IISP candidates will be the ones supporting the domain name, which uniquely identifies the user in their community. For instance, the user whose Internet userID is jean@msn.com is uniquely identified in the MSN™ community. This subscriber is then served by the MSN™ and by the mobile service provider supporting the msn.com domain name.

Still referring to FIG. 2, another feature of the method of the present invention is in building an MNP database 22, which identifies the serving service provider for a given MDN. As discussed above, with MNP, a feature offered in many countries, mobile subscribers are able to move to a new mobile service provider while still keeping their original MDN. It then becomes more difficult for the system to identify the new mobile service provider currently serving the subscriber since the MDN remained the same while the mobile service provider changed. As a result, routing of calls or messages can become complex, as many applications require knowledge of the new serving mobile service provider to ensure traffic is delivered to the intended recipient. The MNP database as in 22 solves this problem by storing information about all mobile numbers assigned to a mobile service provider in the network. In the present invention, records in the MNP database 22 can be updated automatically using the results of search queries implemented by the interconnect hub's search function 38 (as described herein above). If the response provided by a mobile service provider to a search query is valid, a new MNP record is added to the database. Otherwise, in the case of a routing failure due to an invalid response, the hub carries out a new search query that will either invalidate or update the corresponding MNP record in the database. This method thus eliminates the need for manual updating of records.

An additional feature implemented by the interconnect hub 12 is a notification service for invalid Internet userIDs. When the hub 12 fails to route a message to a mobile service provider or IISP using a record from the cache 36, this record is identified as invalid and the search function 38 of the interconnect hub 12 needs to re-conduct one of the search algorithms described herein above to update the cache record and enable proper routing of subsequent IM traffic to the user identifier. On the one hand, if the query response is positive, i.e. the user identifier is being served by a mobile service provider or IISP (or a plurality of these), the interconnect hub 12 updates the long-lived cache 36 accordingly. On the other hand, receipt of a negative response (e.g. "user unknown") implies that the user identifier is not being served by any of the reachable mobile service providers or IISPs. The interconnect hub 12 keeps track of this information in the cache 36, which then provides this response immediately for subsequent requests directed to the same user identifier. To determine if the given user identifier has been served again, the hub 12 can initiate follow-up queries based on various criteria such as time or frequency. For example, the hub 12 can verify if the user identifier has been served again periodically based on a configurable time interval or every time a configurable number of requests is made to the user identifier. Finally, the interconnect hub 12 may also notify the mobile service providers or IISPs that the user identifier is invalid or that the corresponding user has migrated to a new IM community, thus increasing the system's efficiency.

Although the present invention has been described hereinabove by way of specific embodiments thereof, it can be modified, without departing from the spirit and nature of the subject invention as defined in the appended claims.

What is claimed is:

1. A method comprising:
storing, in a cache at an interconnect hub, records of associations between user identifiers (userIDs) for instant message (IM) users and service providers for the IM users, wherein said interconnect hub interconnects a plurality of wireless mobile IM communities and a plurality of wired Internet IM communities for routing text IM communications therebetween, wherein each wireless mobile IM community is serviced by a wireless mobile IM service provider that stores user information in a home location register, wherein each of the wired Internet IM communities is serviced by an Internet IM service provider, wherein each IM user within the wireless mobile IM communities has a mobile directory number (MDN) as their userID, wherein each IM user within the wired Internet IM communities has an Internet userID within an Internet web domain as their userID, and wherein said cache stores records of association between userIDs of IM users in Internet IM communities and Internet IM service providers, and stores records of association between userIDs of IM users in wireless mobile IM communities and wireless mobile IM service providers;
receiving, at said interconnect hub, a text IM communication from a sender including a recipient userID;
checking said cache to find the IM service provider associated with the recipient userID;
if a record exists in said cache for the recipient userID associating an Internet IM service provider to the recipient userID, forwarding the text IM communication to said associated Internet IM service provider;
if a record exists in said cache for the recipient userID associating a wireless mobile IM service provider to the recipient userID, forwarding the text IM communication to said associated wireless mobile IM service provider; and
if no record exists in said cache for the recipient userID, initiating a search among wireless mobile IM service providers and Internet IM service providers to find an IM service provider for the recipient userID by sending a verification request to one or more candidate IM service providers in a first group determined to be likely IM service providers for the recipient userID, and receiving verification responses from said candidate IM service providers in said first group indicating whether the candidate IM service providers are service providers for the recipient userID, and if an IM service provider for the recipient userID is found by the search, forwarding the text IM communication to the IM service provider found for the recipient userID.

2. The method of claim 1 wherein initiating a search to identify a service provider for the recipient userID comprises sending parallel verification requests to a plurality of candidate service providers, and receiving verification responses from said candidate service providers indicating whether the candidate service providers are service providers for the recipient userID.

3. The method of claim 1 wherein initiating a search to identify a service provider for the recipient userID comprises sending a verification request to one or more candidate service providers in a second group, and receiving verification responses from said candidate service providers in said second group indicating whether the candidate service providers are service providers for the recipient userID.

4. The method of claim 1 wherein initiating a search to identify a service provider for the recipient userID comprises sending a query to a directory service and receiving a query response from said directory service indicating one or more candidate service providers for the recipient userID.

5. The method of claim 4 wherein initiating a search to identify a service provider for the recipient userID further comprises sending a verification request to the candidate service providers identified in the query response and receiving verification responses from said candidate service providers indicating whether the candidate service providers are service providers for the recipient userID.

6. The method of claim 1 further comprising updating said cache based on results of said search, wherein the update comprises recording an association between the recipient userID and an Internet IM service provider found by the search and to record an association between the recipient userID and a wireless mobile IM service provider found by the search.

7. The method of claim 6 further comprising initiating a search to identify a service provider for the recipient userID responsive to a routing failure indication, and, if a service provider for the recipient userID is found, updating the cache and forwarding the text IM communication to the service provider found for the recipient userID.

8. The method of claim 7 further comprising marking the recipient userID in said cache as invalid if a service provider for the recipient userID is not found in said search.

9. The method of claim 8 further comprising sending a notification message to the IM sender indicating that the recipient userID is invalid.

10. The method of claim 1 further comprising updating a number portability database based on the results of said search.

11. The method of claim 10 further comprising adding or modifying a record for the recipient MDN in said number portability database if said search returns one or more wireless service providers for the recipient userID.

12. The method of claim 10 further comprising deleting or modifying a record for the recipient MDN in said number portability database if said search fails to return a wireless service provider for the recipient userID.

13. An apparatus comprising:
at least one processor;
at least one non-transitory memory including computer program code for one or more programs,
the at least one non-transitory memory and the computer program code configured to, with the at least one processor, cause the apparatus to perform at least the following:
store, in a cache of the apparatus, records of associations between user identifiers (userIDs) for instant message (IM) users and service providers for said IM users, wherein some of the IM users belong to wireless mobile IM communities and some of the IM users belong to wired Internet IM communities, wherein each wireless mobile IM community is serviced by a wireless mobile IM service provider that stores user information in a home location register, wherein each of the wired Internet IM communities is serviced by an Internet IM service provider, wherein each IM user within the wireless mobile IM communities has a mobile directory number (MDN) as their userID, wherein each IM user within the wired Internet IM communities has an Internet userID within an Internet web domain as their userID, and wherein said cache stores records of association between userIDs of IM users in Internet IM communities and Internet IM service providers, and stores records of association between userIDs of IM users in mobile IM communities and mobile IM service providers;
receive a text IM communication including a recipient userID of said IM communication and check said cache to find the IM service provider associated with the recipient userID;
if a record exists in said cache for said recipient userID associating an Internet IM service provider to the recipient userID, forward said text IM communication to said associated Internet IM service provider;
if a record exists in said cache for the recipient userID associating a wireless mobile IM service provider to the recipient userID, forward the text IM communication to said associated wireless mobile IM service provider; and
if no record exists in the cache for recipient userID, initiate a search among wireless mobile IM service providers and Internet IM service providers to identify an IM service provider for the recipient userID by sending a verification request to one or more candidate IM service providers in a first group determined to be likely IM service providers for the recipient userID, and receiving verification responses from said candidate IM service providers in said first group indicating whether the candidate IM service providers are service providers for the recipient userID, and if an IM service provider for the recipient userID is identified by the search, forward the text IM communication to the identified IM service provider.

14. The apparatus of claim 13 wherein the apparatus is further caused to send parallel verification requests to a plurality of candidate service providers, and to receive verification responses from said candidate service providers indicating whether the candidate service providers are service providers for the recipient userID.

15. The apparatus of claim 13 wherein the apparatus is further caused to send a verification request to one or more candidate service providers in a second group, and to receive verification responses from said candidate service providers in said second group indicating whether the candidate service providers are service providers for the recipient userID.

16. The apparatus of claim 13 wherein the apparatus is further caused to send a query to a directory service and to receive a query response from said directory service indicating one or more candidate service providers for the recipient userID.

17. The apparatus of claim 16 wherein the apparatus is further caused to send a verification request to the candidate service providers identified in the query response and to receive verification responses from said candidate service providers indicating whether the candidates service providers are service providers for the recipient userID.

18. The apparatus of claim 13 wherein the apparatus is further caused to update said cache if one or more service providers for the recipient userID are identified by the search, wherein the update comprises to record an association between the recipient userID and an Internet IM service provider found by the search and to record an association between the recipient userID and a wireless mobile IM service provider found by the search.

19. The apparatus of claim 13 wherein the apparatus is further caused to initiate a search to identify a service provider for the recipient userID responsive to a routing failure indication.

20. The apparatus of claim 19 wherein the apparatus is further caused to mark the recipient userID in said cache as invalid if a service provider for the recipient userID is not found.

21. The apparatus of claim 20 wherein the apparatus is further caused to send a notification message to the IM sender indicating that the recipient userID is invalid.

22. The apparatus of claim 13 wherein each IM user within each wireless mobile IM community has a mobile directory number (MDN), and wherein the apparatus is further caused to update a number portability database if one or more wireless service providers for the recipient userID are identified.

23. The apparatus of claim 22 wherein the apparatus is further caused to add or modify a record for the recipient MDN in said number portability database if one or more wireless service providers for the recipient userID are identified.

24. The apparatus of claim 22 wherein the apparatus is further caused to delete or modify a record for the recipient MDN in said number portability database if a wireless service provider for the recipient userID is not identified.

\* \* \* \* \*